United States Patent
Bader

(10) Patent No.: US 9,821,499 B2
(45) Date of Patent: Nov. 21, 2017

(54) PROCESS FOR PRODUCING MULTILAYERED ARTICLES

(75) Inventor: Christopherus Bader, Neftenbach (CH)

(73) Assignee: Priamus System Technologies AG, Schaffhausen (CH)

(*) Notice: Subject to any disclaimer, the term of this patent is extended or adjusted under 35 U.S.C. 154(b) by 736 days.

(21) Appl. No.: 13/979,983

(22) PCT Filed: Jan. 16, 2012

(86) PCT No.: PCT/EP2012/050571
§ 371 (c)(1),
(2), (4) Date: Sep. 9, 2013

(87) PCT Pub. No.: WO2012/098077
PCT Pub. Date: Jul. 26, 2012

(65) Prior Publication Data
US 2013/0334721 A1    Dec. 19, 2013

(30) Foreign Application Priority Data

Jan. 17, 2011 (DE) .......... 10 2011 000 178
Oct. 7, 2011 (DE) .......... 10 2011 054 278

(51) Int. Cl.
| | | |
|---|---|---|
| *B29C 45/16* | (2006.01) | |
| *B29C 45/76* | (2006.01) | |
| *B29C 45/77* | (2006.01) | |
| *B29C 45/78* | (2006.01) | |

(52) U.S. Cl.
CPC .......... *B29C 45/1646* (2013.01); *B29C 45/16* (2013.01); *B29C 45/164* (2013.01); *B29C 45/1684* (2013.01); *B29C 45/768* (2013.01); *B29C 45/7646* (2013.01); *B29C 45/77* (2013.01); *B29C 45/78* (2013.01); *B29C 2045/1648* (2013.01)

(58) Field of Classification Search
None
See application file for complete search history.

(56) References Cited

U.S. PATENT DOCUMENTS

| | | |
|---|---|---|
| 6,475,579 B1 | 11/2002 | Slat |
| 6,495,226 B1 | 12/2002 | Slat |
| 6,645,575 B2 | 11/2003 | Slat |
| 6,962,670 B1 | 11/2005 | Hanson et al. |
| 7,517,480 B2 | 4/2009 | Sabin et al. |
| 7,651,644 B2 | 1/2010 | Nahill et al. |
| 7,892,462 B2 | 2/2011 | Nahill et al. |
| 8,118,581 B2 | 2/2012 | Nahill et al. |
| 8,329,075 B2 | 12/2012 | Bader |

FOREIGN PATENT DOCUMENTS

| | | |
|---|---|---|
| DE | 19709609 A1 | 9/1998 |
| EP | 1180660 A2 | 2/2002 |
| EP | 1980493 A2 | 10/2008 |
| JP | 0269214 A | 3/1990 |
| JP | 10323874 A | 12/1998 |
| WO | 2005018909 A1 | 3/2005 |
| WO | 2007140447 A1 | 12/2007 |
| WO | 2009040077 A1 | 4/2009 |

OTHER PUBLICATIONS

Chin-Chi Cheng, Yuu Ono, and Cheng-Kuel Jen, Real-Time Diagnosis of Co-Injection Molding Using Ultrasound, Polymer Engineering and Science—2007, pp. 1491-1500, Aug. 1, 2007.

*Primary Examiner* — Benjamin Schiffman
(74) *Attorney, Agent, or Firm* — Bachman & LaPointe, PC

(57) ABSTRACT

A method for producing multilayer objects from a polymer melt, especially in an injection mold, especially preforms having a barrier layer, wherein a viscosity, especially a shear speed, of the melt is determined. The viscosity, especially the shear speed, of at least one layer is determined in the injection mold and optionally monitored and/or regulated.

6 Claims, No Drawings

PROCESS FOR PRODUCING MULTILAYERED ARTICLES

BACKGROUND OF THE INVENTION

The invention relates to a process for producing multi-layered articles from a polymer melt, in particular in an injection mold, in particular from preforms, with a barrier layer.

U.S. Pat. No. 8,329,075 describes in principle a process for monitoring, documenting and/or controlling an injection-molding machine with an injection mold, into which a melt is introduced, a viscosity of the melt in the injection mold being determined directly. In this case, the determination of the viscosity is performed by using the respective quotients of shear stress and shear rate on the basis of pressure differences, the geometry of the cavity and the flow rate of the melt. Sensors for the internal pressure of the mold or sensors for the wall temperature of the mold could be used, for example, for the determination.

The problem addressed by the present invention is that of making the basic concept that is described in U.S. Pat. No. 8,329,075 accessible for further processes and applications.

SUMMARY OF THE INVENTION

The problem is solved by determining, and possibly monitoring and/or controlling, the height and/or thickness of at least one layer, in particular of the barrier layer, during the production of the article.

DETAILED DESCRIPTION

During the production of PET bottles in particular, as are used in their millions in the beverages industry, usually an injection-molding process is used to produced what are known as preforms, which are subsequently formed into the final bottle in a blow-molding process. Already during the injection-molding of the preform, a layer known as a barrier layer, of a second, likewise transparent material, is often injected into the center of the melt (in a way similar to in the case of coextrusion). This layer is intended to prevent the carbonic acid from escaping prematurely from the bottle and the product no longer being suitable for sale. This is a problem for example in the case of very long transportation routes. The production of such preforms is described for example in EP 1 980 493.

From a technical viewpoint, there is the difficulty of detecting whether and when the barrier layer really is present even up as far as the bottleneck, i.e. as far as the region of the screw closure, since this cannot be detected visually on account of the transparency of the layers. This barrier layer may likewise consist of PET, but similarly also of other materials such as PE, PP, etc. Neither tests in the past with special pressure sensors nor the use of temperature sensors have been able provide a way of clearly detecting this barrier layer. Today, it can only be detected by downstream systems, which are very costly.

Generally, however, the scope of the invention covers not only sensing one or more barrier layers of PET preforms but also of all multilayered articles that are produced by the injection-molding or extrusion process (or a combination of the two). These also include, for example, food containers for margarine or ketchup bottles. Depending on the application, the barrier layer may serve the purpose, for example, of preventing oxygen, carbonic acid or light from penetrating into the containers.

Although it is already a huge advantage just to detect the parts that have a barrier layer which is inadequate or overfilled, in order then to separate out inferior parts (that is to say to monitor the process), it is intended that the process should advantageously also be controlled and modified.

What is more, the invention is not only concerned with detecting the presence of a barrier layer, for example digitally (barrier layer present or not present), but is intended also to gradually detect a slowly occurring process-related change in a layer, for example, on account of soiling.

It is also intended moreover that the production process should to be monitored and/or controlled with respect to the state of one or more barrier layers.

With preference, it is intended that the viscosity, in particular the shear rate, of at least the layer to be monitored and controlled in the injection mold should be determined. The present invention thus offers a comparatively simple solution by way of measuring, monitoring and controlling the viscosity, and here in particular the shear rate, especially but not exclusively in the region of the screw closure. The viscosity or shear-rate values are determined by way of the detection of the melt front. This either takes place with the aid of pressure or temperature sensors. Or it is equally conceivable to use what are known as digital/binary switches (for example light guides) for detecting the melt front.

The basic concept is that the flow profile changes fundamentally if only one melt flows through this region instead of two different melts. Since the injection volume of each individual component or each individual layer does not change while this is happening, the shear rate of the individual layers must inevitably change. At a lower shear rate, there is no barrier layer, at a higher, "optimized", shear rate, the barrier layer is present. With preference, of course, the shear rate of each layer is monitored, so that the actual layer of plastic and the barrier layer are differentiated very precisely.

In order only to determine the shear rate, it would be conceivable to use some combination of pressure and temperature sensors, since it is especially the time difference that the melt requires to flow through the flow path between the two sensors that is determined. The easiest and lowest-cost variant would be that of arranging two temperature sensors, since these are on the one hand small and on the other hand also less expensive than pressure sensors.

Instead of monitoring or controlling one or more barrier layers on the basis of a viscosity/shear-rate measurement between two sensors, alternatively the filling time of the melt in the cavity may also be determined and used as a basis.

Controlling allows, for example, the achieved height of the barrier layers (in the case of the preform for example as far as the bottleneck) or else the thickness of the barrier layers to be modified.

Within the scope of the present invention, it is thus intended that the sensors should be combined. This means that the sensor has a sensor housing in which there are at least two sensors. This may be any combination of pressure and temperature sensors, depending on what is desirable. In this way, a viscosity sensor or a shear-rate sensor that can be arranged very easily in the mold wall of a cavity is obtained. At the same time, the distance of the two sensors from one another is also determined and fixed. It need not be subsequently determined nor subsequently set.

The invention claimed is:

1. A method for producing multilayered preforms having a barrier layer from a polymer melt in a mold, comprising the steps of:
   co-injecting a polymer melt with a barrier layer of a different material from the polymer melt to form a preform, wherein the barrier layer is introduced into the mold together with the polymer melt; and
   determining, monitoring and controlling the state of the barrier layer as a function of the viscosity of the polymer melt front.

2. A method according to claim 1 wherein, in the case of producing a preform for bottles, the method comprises detecting when the barrier layer is present up to the region of a screw closure of the bottle.

3. A method according to claim 1, including providing a pair of spaced apart sensors.

4. A method according to claim 1, wherein the determining, monitoring and controlling step further comprises detecting the polymer melt front using at least one temperature sensor.

5. A method according to claim 4, wherein the step of detecting the polymer melt front allows determination of viscosity of the polymer melt front and, thereby, presence of the barrier layer in the melt front.

6. A method according to claim 1, wherein the determining, monitoring and controlling step is conducted in a region of the mold to confirm that the polymer melt and the barrier layer are both flowing through said region.

* * * * *